US010197904B2

(12) United States Patent
Evreinov et al.

(10) Patent No.: US 10,197,904 B2
(45) Date of Patent: Feb. 5, 2019

(54) METHOD AND APPARATUS FOR CREATING A FAST VANISHING LIGHT SCATTERING VOLUME/SURFACE

(71) Applicants: TAMPEREEN YLIOPISTO, Tampereen Yliopisto (FI); FUKOKU CO., LTD., Ageo-shi, Saitama (JP)

(72) Inventors: Grigori Evreinov, Tampere (FI); Ahmed Farooq, Tampere (FI); Roope Raisamo, Tampere (FI); Arto Hippula, Tampere (FI); Daisuke Takahata, Saitama (JP); Kazuyuki Ikehama, Saitama (JP); Tetsuya Arasawa, Saitama (JP)

(73) Assignees: TAMPEREEN YLIOPISTO, Tampereen Yliopisto (FI); FUKOKU CO., LTD., Saitama (JP)

( * ) Notice: Subject to any disclaimer, the term of this patent is extended or adjusted under 35 U.S.C. 154(b) by 66 days.

(21) Appl. No.: 15/051,139

(22) Filed: Feb. 23, 2016

(65) Prior Publication Data

US 2016/0282710 A1 Sep. 29, 2016

(30) Foreign Application Priority Data

Mar. 27, 2015 (JP) ................................ 2015-066080

(51) Int. Cl.
*G03B 21/58* (2014.01)
*G02B 27/22* (2018.01)
(Continued)

(52) U.S. Cl.
CPC ......... *G03B 21/58* (2013.01); *G02B 27/2292* (2013.01); *G03B 21/608* (2013.01);
(Continued)

(58) Field of Classification Search
CPC .. G03B 21/58; G03B 21/608; G02B 27/2292; G03H 1/02; G03H 1/26; G03H 1/0248
(Continued)

(56) References Cited

U.S. PATENT DOCUMENTS 3,334,816 A * 8/1967 Mizuno .................. B05B 17/08
239/18
4,974,779 A * 12/1990 Araki .................. G03B 21/608
239/18
(Continued)

FOREIGN PATENT DOCUMENTS

| | | | |
|---|---|---|---|
| FR | 1075481 | * | 3/1953 |
| JP | H04001539 | | 1/1992 |

(Continued)

OTHER PUBLICATIONS

English translation FR1075481.*
(Continued)

*Primary Examiner* — Steven J Ganey
*Assistant Examiner* — Joel Zhou
(74) *Attorney, Agent, or Firm* — Andrew M. Calderon; Roberts Mlotkowski Safran Cole & Calderon, P.C.

(57) ABSTRACT

One embodiment relates to a method for creating a fast vanishing light scattering surface/volume to which an image is projected. The method includes: creating two portions of atomized particles of a given particle size that does not allow an incident light having a visible spectrum from being scattered, reflected and/or dissipated; and ejecting these two portions of the atomized particles from two opposite directions towards each other. The atomized particles collide/contact with each other to aggregate, thereby creating the fast vanishing light scattering surface/volume at a specific spatial region in which the aggregated particles allow the incident light to be scattered, reflected and/or dissipated.

26 Claims, 6 Drawing Sheets

(51) Int. Cl.
*G03B 21/608* (2014.01)
*G03H 1/02* (2006.01)
*G03H 1/26* (2006.01)

(52) U.S. Cl.
CPC ............. *G03H 1/02* (2013.01); *G03H 1/0248* (2013.01); *G03H 1/26* (2013.01)

(58) Field of Classification Search
USPC ............................................................ 239/18
See application file for complete search history.

(56) References Cited

U.S. PATENT DOCUMENTS

| | | | | |
|---|---|---|---|---|
| 5,067,653 | A | 11/1991 | Araki et al. | |
| 5,265,802 | A | 11/1993 | Hobbs et al. | |
| 5,270,752 | A | 12/1993 | Kataoka et al. | |
| 5,368,228 | A | 11/1994 | Adamson et al. | |
| 5,445,322 | A | 8/1995 | Formhals et al. | |
| 6,318,868 | B1 * | 11/2001 | Larussa | G02B 27/2292 359/630 |
| 6,819,487 | B2 | 11/2004 | Palovuori et al. | |
| 6,857,746 | B2 | 2/2005 | Dyner | |
| 6,997,558 | B2 | 2/2006 | Perlin et al. | |
| 8,500,038 | B2 * | 8/2013 | Fuller | B05B 7/0807 239/17 |
| 8,511,828 | B2 * | 8/2013 | Fuller | G03B 3/12 239/18 |
| 8,567,954 | B2 | 10/2013 | Koehler et al. | |
| 2004/0001182 | A1 | 1/2004 | Dyner | |
| 2004/0080820 | A1 * | 4/2004 | Palovuori | G03B 21/608 359/443 |
| 2011/0285964 | A1 | 11/2011 | Reichow | |

FOREIGN PATENT DOCUMENTS

| | | |
|---|---|---|
| JP | H05107644 | 4/1993 |
| JP | H08110069 | 4/1996 |
| JP | 2009103779 | 5/2009 |
| JP | 2006243338 | 9/2014 |
| WO | WO2008/126018 | 10/2008 |

OTHER PUBLICATIONS

Plasencia et al., "MisTable: Reach-through Personal Screens for Tabletops", Session: Novel Mobile Displays and Devices, CHI 2014, pp. 3493-3502.

Halabi et al., "Efficient Vector-oriented Graphic Drawing Method for Laser-scanned Display", Displays 30, Mar. 12, 2009, pp. 97-106.

Wikipedia, "Light Scattering", https://en.wikipedia.org/wiki/Light_scattering, Dec. 30, 2015 ; 4 Pages.

Guttler et al., "Normal Collisions of Spheres: A Literature Survey on Available Experiments", arXiv:1204.0001v2 [physics.class-ph], May 28, 2013; 14 Pages.

Hu et al., "Particle Collision Rate and Small-Scale Structure of Particle Concentration in Turbulent Flows", University of Florida, 1998; 161 Pages.

Sodhi et al., "AIREAL: Interactive Tactile Experiences in Free Air", SIGGRAPH '13, Jul. 21-25, 2013; 10 Pages.

Pazhi et al., "Basics of the Technology of Liquid Spraying", Khimiya Chemistry, 1984, pp. 47-51. (Concise explanation at p. 7, line 12-15 of the specification).

Japanese Office Action for JP application No. 2016-058637 dated Dec. 4, 2018, 5 pages.

* cited by examiner

METHOD AND APPARATUS FOR CREATING A FAST VANISHING LIGHT SCATTERING VOLUME/SURFACE

CROSS-REFERENCE TO RELATED APPLICATION(S)

This application claims priority from Japanese Patent Application No. 2015-066080 filed on Mar. 27, 2015, the entire contents of which are incorporated herein by reference.

TECHNICAL FIELD

The present invention relates generally to creation of a projection plane (screen) or a projection volume, more specifically, relates to a method or an apparatus capable of creating a projection plane (screen) or a projection volume which promptly dissipates after being generated.

BACKGROUND ART

A projection plane (screen) usually refers to a surface which reflects the light or makes the light beam visible due to different type of scattering or/and absorption. In particular, the phenomenon of Mie scattering of light by spherical particles of any diameter allows creating a projection screen in air by spraying the mist, gas, liquid or a specific substance (snow, dust or the like).

Similarly, a projection volume refers to a three-dimensional object which reflects the light or makes the light beam visible as a 3D pattern due to different type of scattering or/and absorption.

In particular, the 3D display system as disclosed in U.S. Pat. No. 8,567,954-B uses a planar sheet of mist or water droplets as a rear projection screen and a suitable optical filtering mechanism for projecting and viewing the 3D content, for projector and both eyes of a viewer. The screen is substantially planar and has a front surface facing a viewing area and an opposite rear surface.

In another system disclosed in U.S. Pat. No. 8,511,828-B, the authors proposed to arrange a plurality of nozzles ejected water fountains to produce a water mist onto which the projector projects images. The controller is able to synchronize the projector and, at least, one of a plurality of nozzles to produce a water mist in a sequence such that the images have appeared at different distances from the projector at different times. The controller may further control the orientation of each nozzle to vary the distance by inclining the plane of the water mist relative to the surface of the body of water. Such the installation could work well for public sites such as hotels, amusement parks, and shopping centers where there is enough space for a big water reservoir (as a fountain or a swimming pool or the like), when an extra humidity even improves the ambient conditions. However, the solution like this or disclosed in U.S. Pat. No. 5,067,653-A are not appropriate for a portable desktop installation, for projection and interaction with 3D graphic content.

Some efforts have already been undertaken by different companies to develop a realistic 3D display. However, any technology exhibits limitations.

For instance, Heliodisplay Mid-air projection system disclosed in US-2004/0001182-A or U.S. Pat. No. 6,857,746-B are actually able to shape a flat projection screen and consequently only 2D projections on a scattering surface of the water mist condensed from air. Nevertheless, the Heliodisplay prices range from $39,000 USD for a model L to $66,000 USD for a model XL that does not correspond to a limited functionality of the system.

In the system disclosed in US-2011/0285964-A, it was proposed to create the projection screen with the use of snowmaking machine. The flowing snow is output in a substantially planar thin sheet by imitating the regular screens manufactured from different materials such as fabrics, painted wood, metal, plastic, or other solid substance. Like in many other approaches (U.S. Pat. No. 5,445,322-A, U.S. Pat. No. 5,368,228-A, U.S. Pat. No. 5,265,802-A and U.S. Pat. No. 3,334,816-A), by shaping the planar scattering screen surface, the systems do not allow to display the realistic 3D images viewed by naked eyes from a different viewing angle.

The Holodust system (U.S. Pat. No. 6,997,558-B) is a true open-air volumetric display based on detection of dust particles, stochastically distributed over a limited volume, by rapidly sweeping infrared laser and highlighting/'lighting up' by the second (color) laser (coaxial to the invisible one) only the particles (voxels) in the positions that correspond to the simulated 3D model. Nevertheless, the authors have been more focused on the method of selective illuminating the particles and not on the way of suspending light scattering particles properly in the volume. It was only mentioned that the dust particles could be relatively large particles of fabrics (such as lint, wool or similar) of about 0.5-1.0 mm in length and the cloud of particles should be not visible to an unaided eye under normal lighting conditions. While the quality of 3D images might significantly be improved with the use of vector-oriented graphic drawing method for laser-scanned display (Halabi, O. et al. "*Efficient vector-oriented graphic drawing method for laser-scanned display*" Displays, 2009, 30, 97-106 and WO-2008-126018-A), the system used in the prototype for creating suspending particles was cumbersome and failed to be produced in a compact form factor.

Instead of the dust generator it would be possible to use any other solution as disclosed, for example, in U.S. Pat. No. 6,819,487-B, U.S. Pat. No. 5,270,752-A or Plasencia, D. M. et al. "*MisTable: reachthrough personal screens for tabletops*" Proceedings of the SIGCHI Conference on Human Factors in Computing Systems, 2014, 3493-3502 (doi>10.1145/2556288.2557325). However, while these techniques are able to create a projection volume, these techniques are bulky as the Holodust system (U.S. Pat. No. 6,997,558-B). Even if it would be possible to produce with a limited functionality any of proposed mist generators in a compact form factor, the method disclosed in the mentioned patents cannot support many new emerging demands (e.g., US-2004/0001182-A). Because a higher density mist in the whole volume will obscure and distort a larger part of the 3D content, while a low density mist could allow to display only primitive graphics with a poor resolution, as translucent images will overlap and interfere with each other.

Nowadays, there are many techniques and variants of creating stereoscopic and holographic images as well as producing commercial displays/monitors which allow an observer with two naked eyes to perceive two different images, when the observer is looking into a display screen and no glasses is required. However, there is no mist/fog based display that could be able to display objects in thin air as 3D images, that is an observer would be able to view with two naked eyes different content from a different viewing angle. The illusion images, which many authors claimed as 3D, actually present a planar (2D) image projection over the "shell" (the outer layers) of the high-density scattering screen surface or volume and do not allow to simultaneously project/reflect multiple projections in depth. As the mist/fog/fluid presents a translucent substance which will interfere overlapped images or obscure their parts (see references mentioned above).

The solutions that have been already realized were targeted to improve quality of the projected planar images by increasing density and stabilizing the planar scattering screen surface or volume. However, the more scattering screen is stable and less transparent the more time is required with known techniques (which are based on ejection a laminar air flow) to alter a spatial location of the scattering centers from one slice of 3D volume to another one. To display a sequence of the plurality of multiple images or slices in a volumetric region which will not overlap and interfere, the scattering volumes/surfaces should immediately disappear after the frame was highlighted using the method disclosed in Halabi, O. et al. "*Efficient vector-oriented graphic drawing method for laser-scanned display*" Displays, 2009, 30, 97-106, U.S. Pat. No. 6,997,558-B, WO-2008-126018-A or the like.

SUMMARY

This invention is made in view of the above-mentioned problems, and one object of the invention is to provide a method or an apparatus capable of creating a light scattering volume or plane (screen) which vanishes fast.

One aspect of the invention provides a method for creating a fast vanishing light scattering surface/volume to which an image is projected, the method including: creating two portions of atomized particles of a given particle size that does not allow an incident light having a visible spectrum from being scattered, reflected and/or dissipated; and ejecting these two portions of the atomized particles from two opposite directions towards each other, wherein the atomized particles collide/contact with each other to aggregate, thereby creating the fast vanishing light scattering surface/volume at a specific spatial region in which the aggregated particles allow the incident light to be scattered, reflected and/or dissipated.

Another aspect of the present invention provides an apparatus for creating a fast vanishing light scattering surface/volume, the apparatus including: two of mist/spray generators configured to create two portions of atomized particles of a given particle size that does not allow an incident light having a visible spectrum from being scattered, reflected and/or dissipated, and to ejecting these two portions of the atomized particles from two opposite directions towards each other, wherein the atomized particles collide/contact with each other to aggregate, thereby creating the fast vanishing light scattering surface/volume at a specific spatial region in which the aggregated particles allow the incident light to be scattered, reflected and/or dissipated.

According to the above-mentioned features, it is possible to provide a cost effective method or apparatus for creating a fast vanishing light scattering volume/surface. The use of the fast vanishing light scattering volume/surface and an appropriate laser-based imaging techniques allows to display a plurality of momentary images in the mid-air appeared at different distances from the projector at different times and at different angles of view, while avoiding the interference between the images on the light scattering substance.

DETAILED DESCRIPTION

Figure 1A:
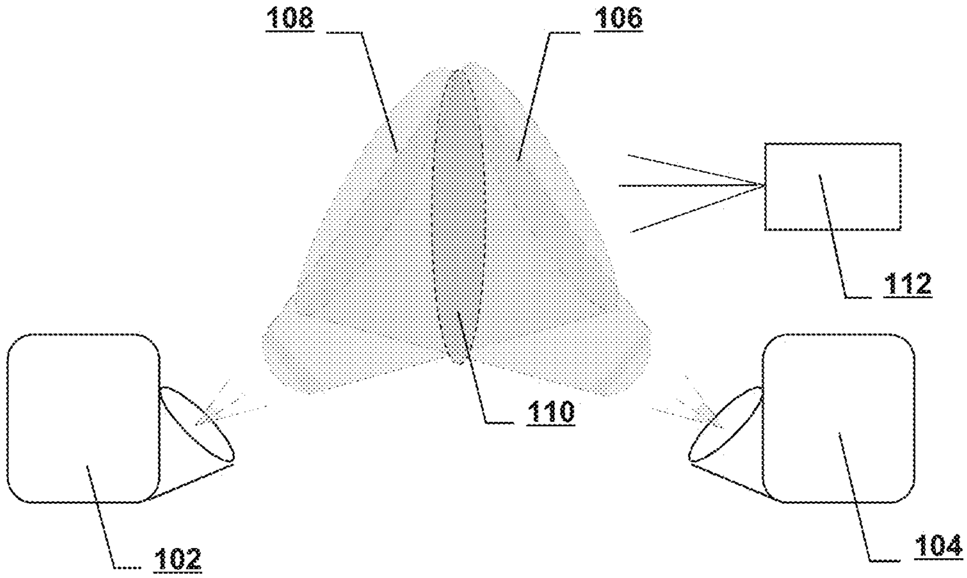
FIG. 1A illustrates the basic (upwards) principle of creating the fast vanishing light scattering volume based on collision/contact of two discrete portions ('clouds'-like) of spray/mist, and the use of laser projector of the momentary image according to an embodiment.

The embodiments will avoid the problems exhibited when the light scattering surface/volume of the spray/fog/mist/dust is supported continuously by imitating a regular projection screen made of fabric or other solid material. The embodiments will be described with reference to the accompanying drawings. In the drawings and the description, the same reference numbers are used to refer to the same or like parts.

Momentary image display techniques based on light-emitting lasers may be used (e.g., Halabi, O. et al. "Efficient vector-oriented graphic drawing method for laser-scanned display" Displays, 2009, 30, 97-106, U.S. Pat. No. 6,997,558-B and WO-2008-126018-A). However, the fast vanishing light scattering volume/surface that has to be exactly positioned in the mid-air still presents the problem to be solved to display a plurality of momentary images which will not interfere with each other.

Theoretically (e.g., WIKIPEDIA "*Light scattering*" http://en.wikipedia.org/wiki/Light_scattering and Pazhi, D. G et al. "*Basics of the Technology of Liquid Spraying*" Publisher: Khimiya (Chemistry), 1984, 47-51), the scattering intensity is generally not strongly dependent on the wavelength, but is sensitive to the particle size. Mie scattering intensity for large particles than the wavelength of the light is proportional to the square of the particle diameter. On the other side, according to Guettler, C. et al., "*Normal Collisions of Spheres: A Literature Survey on Available Experiments*" arXiv:1204.0001 and Hu K. C., "*Particle Collision Rate and Small-Scale Structure of Particle Concentration in Turbulent Flows*" Ph. D. Thesis in University of Florida, 1998 micrometer-size particle collisions demonstrate adhesive properties, so that during paired collision of two flows, it could appears a volume of particle aggregates having a greater size than original mist droplets.

JP-H08-110069-A discloses the ultrasonic humidifier that has a compact-size and able to jet a portion of mist of water or other liquid substance having a necessary surface tension and the droplets of the needed micrometer-size in the mid-air in the specific direction at a given distance. There are also other techniques, based on magnetostrictive transducers and other liquid spraying methods (Pazhi, D. G et al. "*Basics of the Technology of Liquid Spraying*" Publisher: Khimiya (Chemistry), 1984, 47-51), and pneumatic jet systems (Sodhi, R. et al, "*AIREAL: Interactive Tactile Experiences in Free Air*" Journal ACM Transactions on Graphics, 2013, 32, 4, Article 134) able to deliver a portion of gaseous substance in the exact spatial location.

With increasing the distance, ejected mist particles will lose speed and energy, and will dissipate. Nevertheless, it is possible to assign the optimal mist/liquid parameters and the distance between paired humidifiers or another spraying systems when the collision/contact of droplets of opposite portions of the mist will be inelastic by allowing them to easily merge/coalesce/aggregate and increase in size to efficiently reflect and scatter the light.

The aggregated droplets having a low energy will be not able to continue propagate in a straight path or along a ballistic trajectory. The higher density mist will fall due to gravity or/and dissipate. Nevertheless, the method disclosed in Halabi, O. et al. "*Efficient vector-oriented graphic drawing method for laser-scanned display*" Displays, 2009, 30, 97-106 or U.S. Pat. No. 6,997,558-B allows to project the visual content in sync at the moment when density of aggregated droplets, as a result of collision/contact of two mist portions, will achieve a maximum value.

The scattering screen or volume could be generated and presented in a sequence at different distances from the projector at different times and at different angles of view in a radial order, wherein images will not interfere with each other on the light scattered substance.

In accordance with the invention, the light scattering centers are not required to be supplied as a continuous or/and laminar flow, in any manner to shape a substantially planar sheet of mist or water droplets to mimic a projection screen. Instead of that, the light scattering volume has to appear for a predefined short period of time in the exact spatial location in the mid-air and to disappear immediately after the collision/contact and aggregation of the mist particles took place. The period of time should be enough for imaging and perceiving the momentary image, while the exact time depends on complexity of the image content and the observation conditions.

In the result of collision/contact, the two clouds/portions of mist/spray are not able to shape the exactly planar light scattering surface. However, it is not required for laser projection method (U.S. Pat. No. 6,997,558-B) in view of Halabi, O. et al. "Efficient vector-oriented graphic drawing method for laser-scanned display" Displays, 2009, 30, 97-106 or WO-2008-126018-A. Nevertheless, the light scattering volume could have a quasi-planar shape or could be thick enough if necessary and the light scattering volume must exist a very short time as possible, being synchronized with a momentary image projection. The time of existence of the scattering volume could be predefined by the size of clouds and the mist/spray droplets ejected, and by the properties of the mist/spray substance, in particular, a surface tension.

Of course, the present invention did not limited to a passive dissipation of the aggregated droplets under gravity. Any suitable techniques could speed up the process of disappearing or/and dissipation of the light scattering centers. For example, a short pulse of air pressure from the top could speed up dissipation of the light scattering volume.

Substantially that the size of the mist/spray droplets ejected should be, at least, by about twice less than the size of aggregated light scattering centers. Therefore, the aggregated droplets will scatter light by four times stronger than of the mist/spray droplets ejected. By other words, the mist/spray droplets ejected could be substantially transparent and invisible to the observer. To increase the coalescence/aggregation efficiency the portions of droplets could be charged positively and negatively when they left the surface of mesh transducer.

Figure 1B:
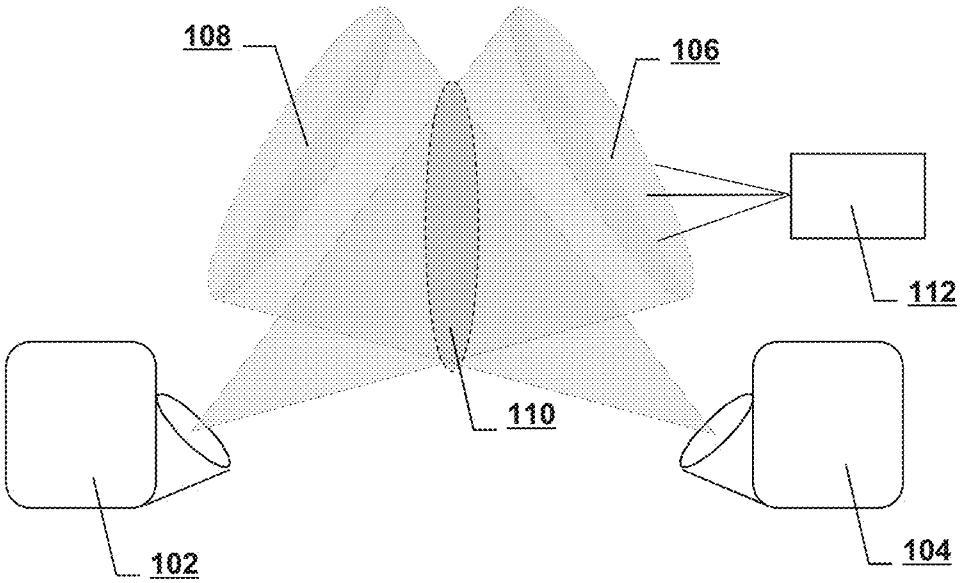
FIG. 1B illustrates the same principle as in FIG. 1A, while two discrete portions of the mist are conditionally shown as two solid angles (or cones) limiting the space of the droplets propagation. Such an imaging of the mist will be used for simplicity in other illustrations.

FIG. 1A illustrates the basic principle of creating the fast vanishing light scattering volume 110 in upwards direction that appears in the result of collision/contact of two discrete portions ('clouds'-like) 106 and 108 of mist/spray, and the use of laser projector 112 of the momentary image according to an embodiment. Two humidifiers 102 and 104 eject the two discrete portions of mist/spray 106 and 108 from opposite directions towards each other. The humidifiers 102 and 104 function as mist/spray generators. However further for simplicity of illustrations, an image of the mist portion may be shown conditionally as a solid angle (a cone) limiting the space of the droplets propagation (FIG. 1B).

The fast vanishing light scattering volume 110 is created at a given special location so as to exist a given short time, and a visual content is projected from the laser projector 112 on the light scattering volume 110 in synchronization with a density peak of the aggregated particles.

The light scattering volume 110 having been created fast dissipates due to a gravity force applied on the aggregated droplets. In addition to or instead of the gravity force, a short pulse of air pressure from, for example, the top may be applied to speed up dissipation of the light scattering volume 110.

The two discrete portions of mist/spray 106 and 108 may include a substance which emits an aromatic odor upon coalescence/aggregation due to collision/contact or upon irradiation by a laser beam.

The two discrete portions of mist/spray 106 and 108 may include a substance which emits a light upon coalescence/aggregation due to collision/contact or upon irradiation by a laser beam.

Figure 2A:
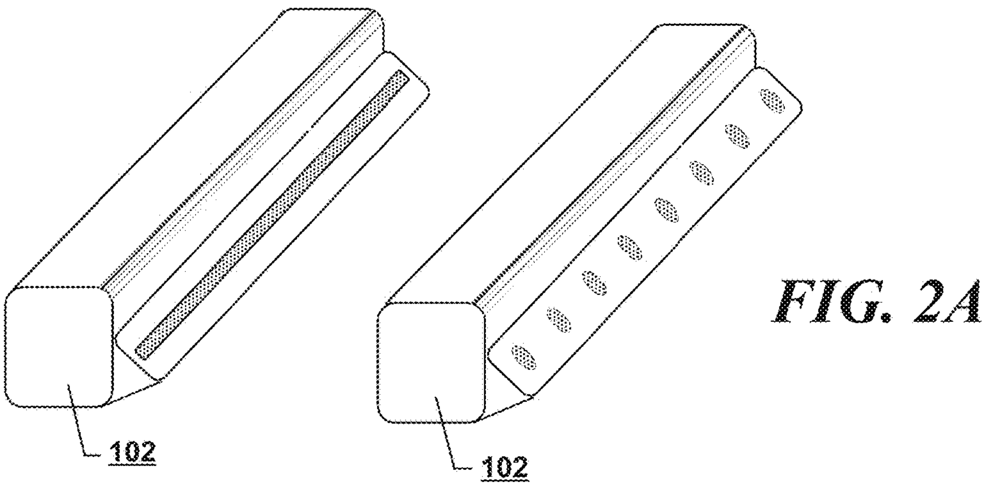
FIG. 2A illustrates exemplary arrangements of the humidifiers assembly. The symmetrical opposite components have not been shown.

It is apparent that humidifiers 102 capable of ejecting a portion of spray in a given direction can have different design and configuration, being embodied in a cartridge form factor for example as shown in FIG. 2A or in another form, those skilled in art able to design.

Figure 2B:
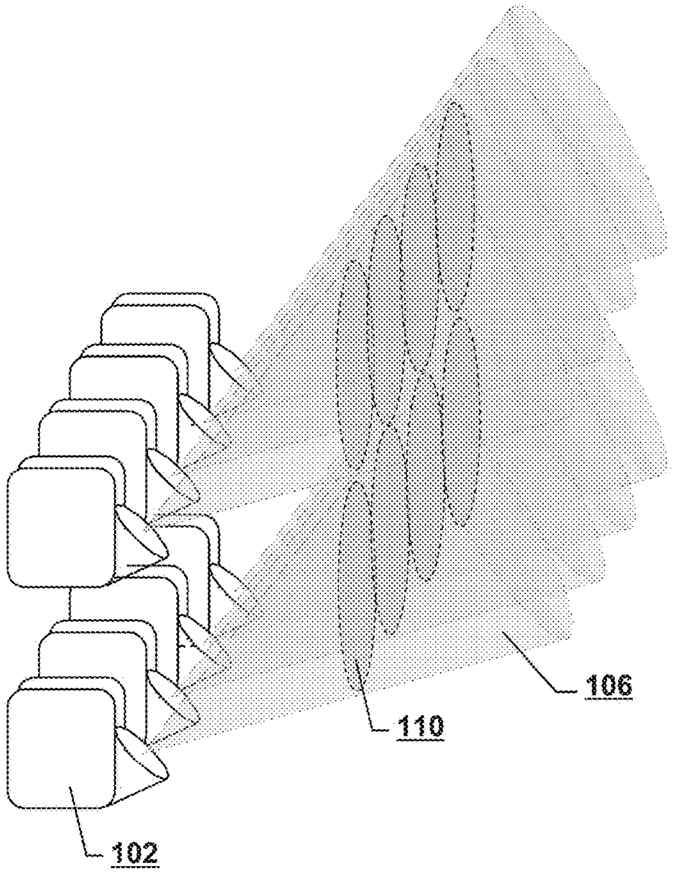
FIG. 2B illustrates the method of creating an extended fast vanishing light scattering volume/surface with the use of array of multiple cartridge-like humidifiers. The symmetrical opposite components have not been shown.

The humidifiers 102 and 104 can include a special container for the liquid substance or such a container can be separated from the ejectors 102A and 104A (dischargers provided with mesh transducers) of the humidifiers 102 and 104. To create an extended light scattering volume/surface a number of humidifiers can be assembled into an array as shown, e.g., in FIG. 2B.

Figure 3:
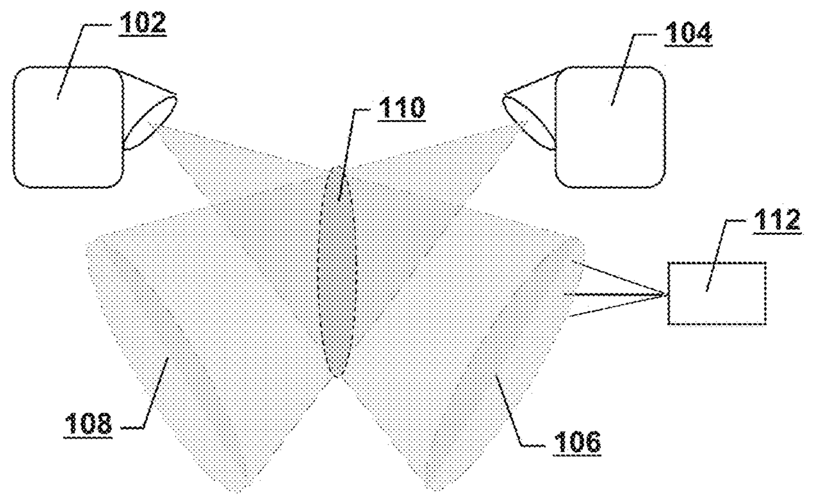
FIG. 3 illustrates the alternative (downwards) example of creating the fast vanishing light scattering volume and laser projector of the momentary image according to an embodiment.

FIG. 3 illustrates the alternative example of creating the fast vanishing light scattering volume 110 in downwards direction of the humidifiers 102 and 104.

Figure 4:
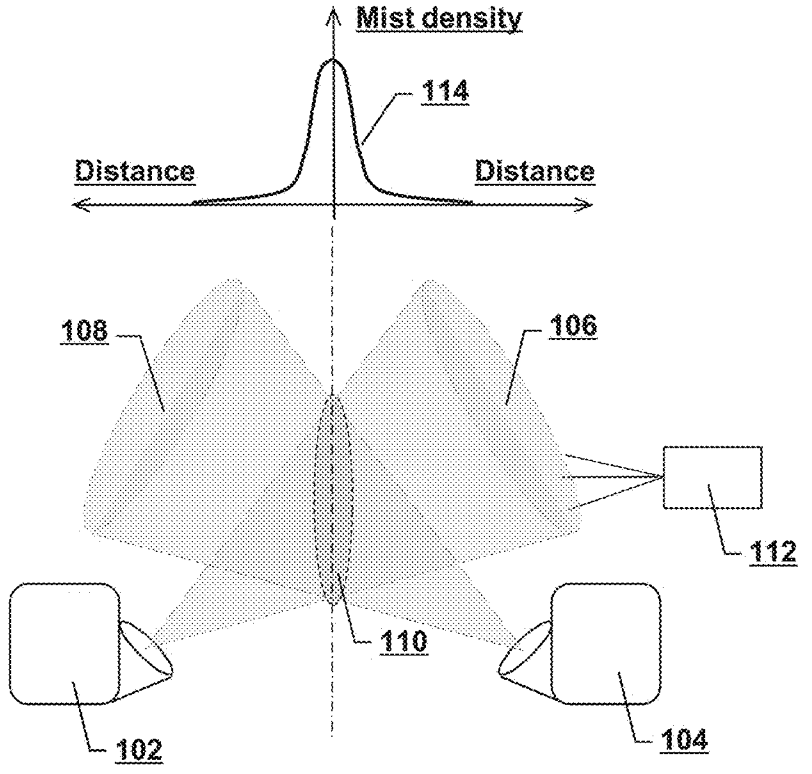
FIG. 4 illustrates the basic (upwards) principle of creating the fast vanishing light scattering volume and density of drop size distribution at the time moment of the image projection according to an embodiment.

In FIG. 3, the fill (color) density of a solid angle (a cone) limiting the space of the droplets propagation does not reflect an actual density of drop size distribution at the time moment of the image projection according to an embodiment. Therefore, a graph 114 in the top of FIG. 4 illustrates that the mist density falls quickly as a function of distance from the collision/contact location.

Figure 5:
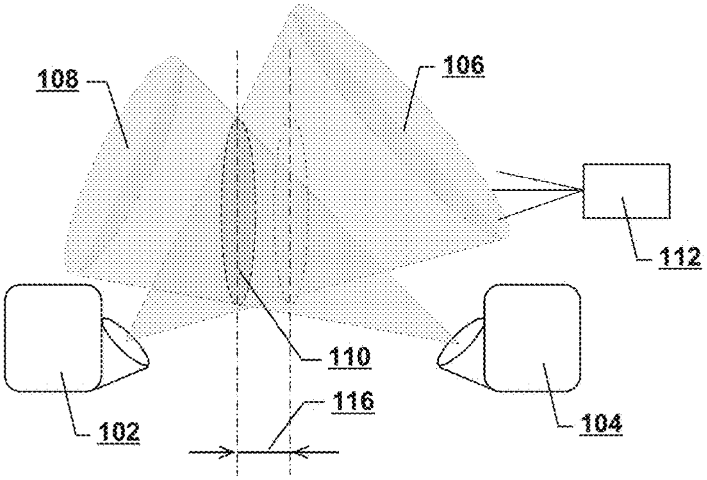
FIG. 5 illustrates a possibility and a way to control displacement of the spatial location of the fast vanishing light scattering volume appeared at different distances from the projector.
Figure 6A:
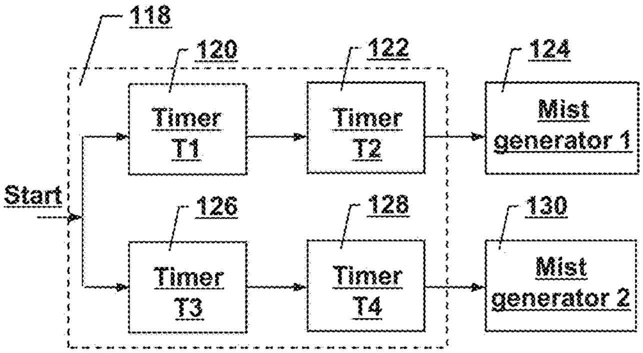
FIG. 6A illustrates a functional block diagram of the controller of two humidifiers.

Humidifiers 102 and 104 can be initiated sequentially, as shown in FIG. 5, with a predefined time-shift 116 between onsets. In such a case, it is possible to change a spatial location of collision/contact 110 of the two portions of mist 106 and 108. FIG. 6A illustrates a functional block diagram of the controller for such a case according to an embodiment.

In particular, the controller 118 of two mist generators 124 and 130 which intended to excite ultrasonic transducers at a resonance frequency of about 100 kHz, comprised of four timers 120, 122, 126 and 128.

Figure 6B:
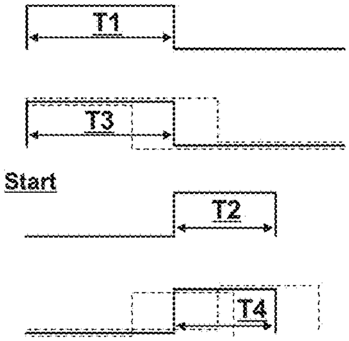
FIG. 6B illustrates the waveforms of the sequence of the time intervals relating to FIG. 6A.

Timer 120 maintains a reference time interval T1 (FIG. 6B) regarding to that timer 126 is able to shift onset of the timer 128, while onset of the timer 122 is fixed. Thus, interval T4 can be shifted regarding the interval T3 by defining the spatial location where a collision/contact of two portions of mist particles will occur. The duration of time intervals T2 and T4 defines the portions 106 and 108 of mist particles ejected by the humidifiers 102 and 104 (FIG. 5).

Figure 7A:
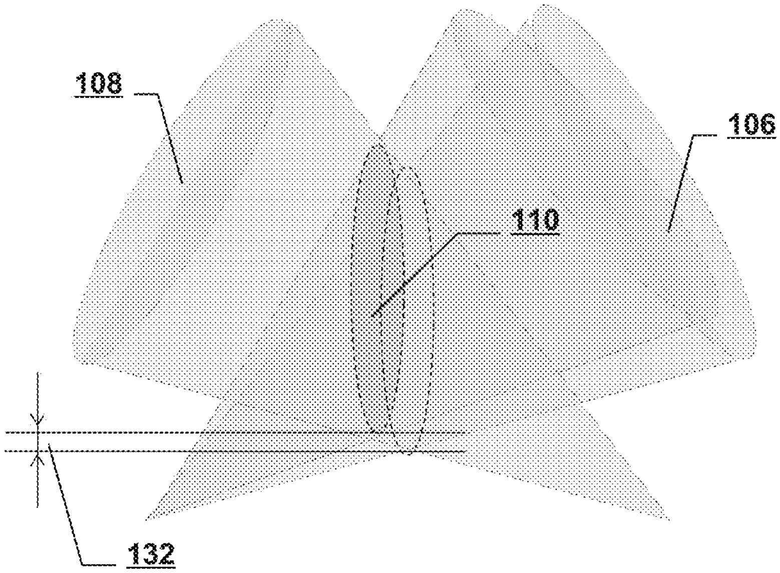
FIG. 7A illustrates a possible deviation from anticipated spatial location of inelastic collision/contact of two opposite portions of mists' particles as a result of the controllable time delay according to an embodiment.

Time shifting activation (onsets) of mist generators 124 and 130 will affect not only onto a collision/contact location along a lengthwise direction between the humidifiers 102 and 104, but also onto a minor deviation 132 in vertical direction (FIG. 7A) cased by the difference between the vertical velocity components of two portions of mist particles.

Figure 7B:
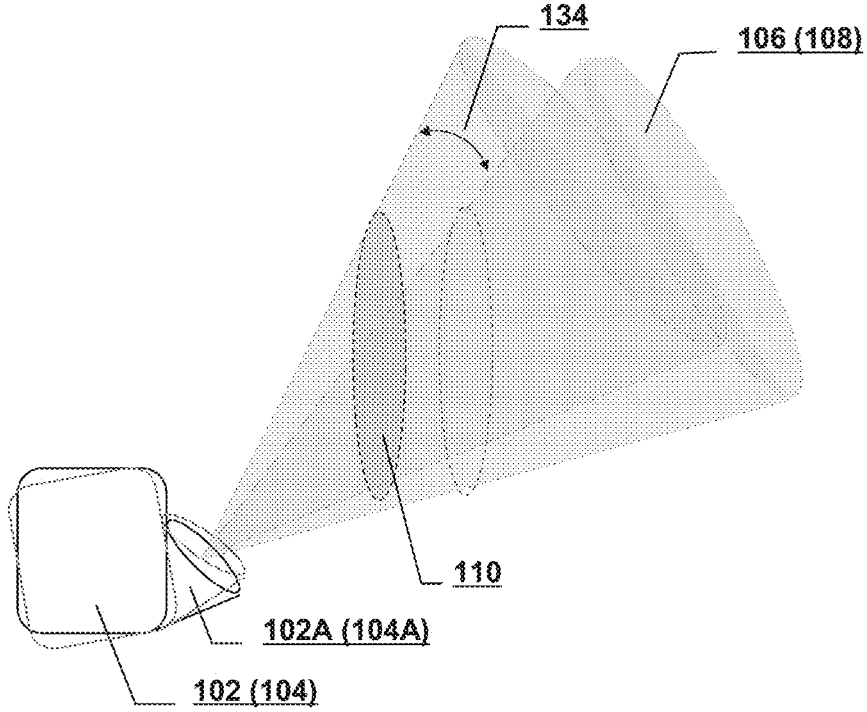
FIG. 7B illustrates a method of compensating deviations of spatial location of the light scattering volume through control of the humidifiers/nozzle inclination.

Making a direction of ejection adjustable (FIG. 7B) could compensate such a deviation. For example, the use of the voice coil linear actuator allows adjusting the inclination of the humidifier 102/104 fast and accurately. The voice coil linear actuator may be controlled by an electronic controller. The voice coil linear actuator is just an example. For example, any suitable type and nature, such as piezoelectric, magnetostrictive, electromagnetic (voice-coil), pneumatic, hydraulic, dielectric elastomer or the like can be utilized for the actuator.

Moreover, by allowing adjustment of inclination of the humidifier 102/104, functionality of the imaging system can be extended because an inclination of the light scattering volume can be arbitrary adjusted.

The humidifier 102/104 may be supported on a pivotable supporter (not shown in the figures) such that an elevational angle and/or an azimuthal angle of the humidifier 102/104 can be adjusted. Alternatively, the ejector 102A/104A (the discharger provided with the mesh transducer) of the humidifier 102/104 may be supported on a pivotable supporter (not shown in the figures). The pivotable supporter may be controlled by the electronic controller to thereby adjust the elevational angle and/or the azimuthal angle.

Figure 8:
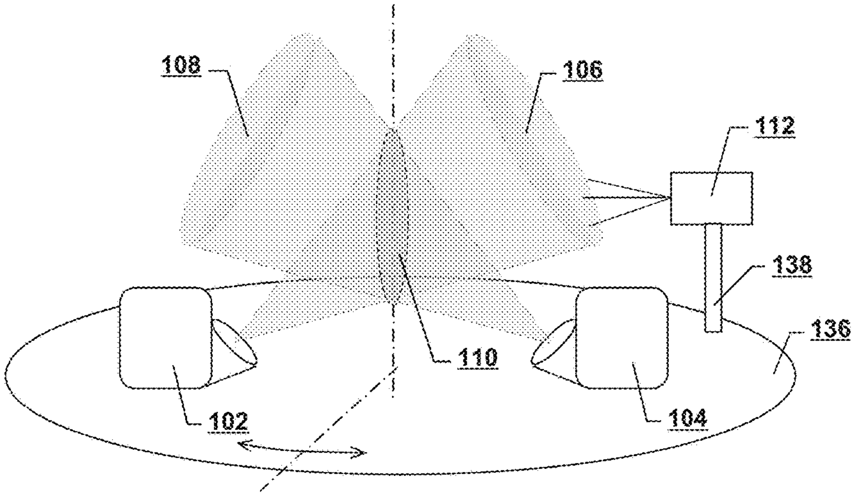
FIG. 8 illustrates the possible way of rotating the light scattering volume and image projection system with respect to the angle of view or 3D content to be observed at each moment.

The humidifiers 102 and 104, and the laser projector 112 with a supporter 138 could be mounted on the rotating platform 136, which is capable of rotating clockwise and counterclockwise by allowing to adjust the angle of view of the momentary image (FIG. 8).

Figure 9:
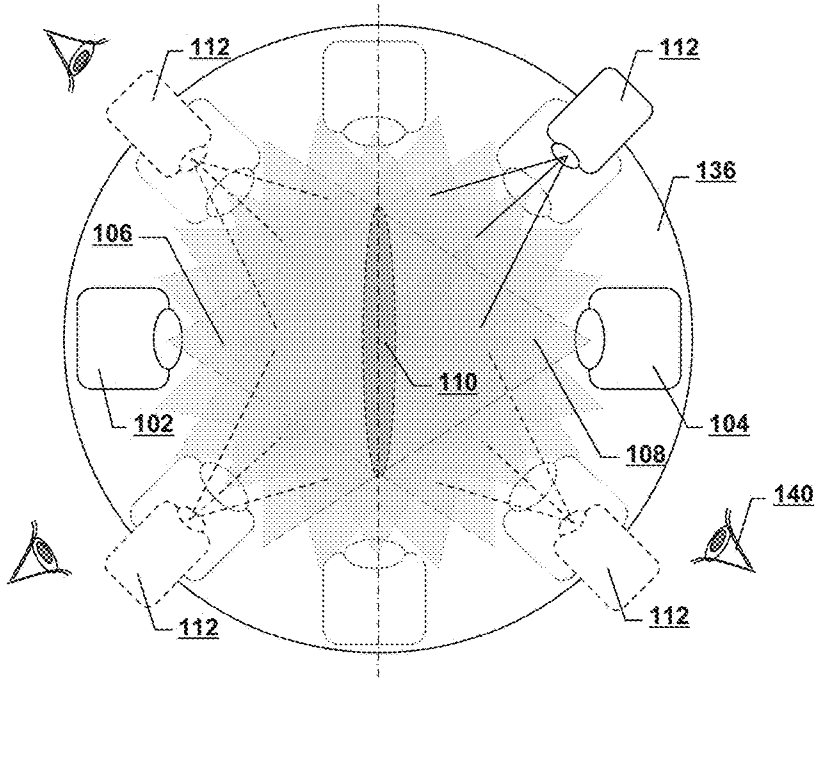
FIG. 9 illustrates an exemplary of the way of creating a plurality of the light scattering volumes and momentary images in the mid-air appeared at different distances from the projector at different times and at different angles of view.

Instead of the rotating platform or in addition to the capability of rotating, a plurality of pairs of humidifiers (102, 104) or/and laser projectors 112 could be mounted on the platform 136 as shown in FIG. 9, wherein the projectors 112 could display the same or different content, specific features or portion of the momentary image.

However, the present invention is not limited to a specific number and horizontal arrangement of paired humidifiers mounted on a single platform. The bottom platform could have an opposite counterpart above it. That is, a combination of methods shown in FIGS. 1A, 1B and FIG. 3 could be used to form a light scattering volume as well.

Moreover, an adjustable inclination of the multiple humidifiers allows to form not only a quasi-planar light scattering volume/surface, but also a specifically complex relief/pattern of the "fog-tiles" that could not be realized with the use of any known techniques.

Some tiles could be raised over others, inclined in opposite directions and their content and spatial parameters (location, orientation) could be dynamically altered.

The invention may be variously embodied, and preferred configurations are exemplified below.

The invention provides a method for creating a fast vanishing light scattering volume for projection a sequence of images, the method including: creating two portions (clouds) of particles of a given size that are not able to efficiently scatter or/and reflect/dissipate the light in the visible spectrum, ejecting these two portions (clouds) of particles from two opposite directions towards each other with an optimal angle of elevation, creating the condition of the particles collision/contact in a specific spatial region to coalesce them for increasing the size of scattering centers to enable scattering or/and reflecting/dissipating the light in the visible spectrum.

The method may further include: projecting a visual content onto a light scattering volume in sync at the moment when density of aggregated particles will achieve a maximum value; and controlling temporal parameters and synchronization of electronic components such as mist/spray generators and image projector.

The invention may be embodied such that two portions (clouds) of particles is formed of a liquid substance.

The invention may be embodied such that particles present droplets of liquid having a given surface tension facilitating adhesion and aggregation at collision/contact.

The invention may be embodied such that a size of droplets is small enough (e.g., 4-10 micrometers) to affect on the visible light, that is, clouds of droplets are not able efficiently scattering or reflecting/dissipating the light in the visible spectrum.

The invention may be embodied such that two portions (clouds) of particles is formed of a solid substance.

The invention may be embodied such that a size of solid particles is small enough (e.g., 4-10 micrometers) to affect on the visible light, that is, clouds of particles are not able efficiently scatter or reflect/dissipate the light in the visible spectrum.

The invention may be embodied such that two portions (clouds) of particles present a mist or spray of the liquid.

The invention may be embodied such that two portions (clouds) of particles include the fluorescent or phosphorescent substance which is substantially transparent and invisible to the observer under normal daylight conditions.

The invention may be embodied such that two portions of particles of liquid present two different substance, which are being merged or being in contact due to collision/contact, produce the new substance which is able to fluorescent or phosphorescent being activated.

The invention may be embodied such that the substance of aggregated particles can be activated by a laser beam having a non-visible spectrum, while fluorescence or phosphorescence can be detected visually (by naked/unaided eye).

The invention may be embodied such that two portions (clouds) of particles from two opposite directions are charged positively and negatively accordingly when they left the surface of mesh transducer of the humidifiers to increase the coalescence efficiency.

The invention may be embodied such that humidifiers, or another component ejecting the particles from two opposite directions towards each other are added with a pivoted support allowing to adjust an optimal angle of elevation of mesh transducers or the whole humidifiers (with a tank of the liquid or solid substance). That is, the pivoted support provides a rotation of said humidifiers in, at least, vertical direction and includes an electronic controller to control such functionality.

The invention may be embodied such that a pivoted support allowing to adjust an optimal angle of elevation and azimuth of mesh transducers has an electronic controller to control and synchronize such functionality.

The invention may be embodied such that at least, two humidifiers with a pivoted support and a projector are mounted on a rotating platform that has a separate electronic controller to control and synchronize its position with respect to the location of an observer or in any other way.

The invention may be embodied such that multiple paired humidifiers with a pivoted support can be assembled into two opposite arrays are able to form a quasi-planar light-scattering surface/volume.

The invention may be embodied such that multiple paired humidifiers are able to form a complex relief/pattern of the "fog-tiles", when spatial parameters of each of "fogtiles" can be dynamically adjusted in mid-air (i.e., for example, the light scattering volumes have different angles of inclination with respect to each other and distances from the projector).

The invention may be embodied such that aggregated droplets or the light scattering centers fall/dissipate due to gravity or the system added with a component to speed up dissipation of the light scattering volume.

The invention claimed is:

1. A method for creating a fast vanishing light scattering surface/volume to which an image is projected, the method comprising:

creating two portions of atomized particles of a given particle size that does not allow an incident light having a visible spectrum from being scattered, reflected and/or dissipated prior to aggregation of the atomized particles; and ejecting these two portions of the atomized particles from two opposite directions towards each other, wherein the atomized particles collide/contact with each other to aggregate, thereby creating the fast vanishing light scattering surface/volume at a specific spatial region in which the aggregated particles allow the incident light to be scattered, reflected and/or dissipated.

2. The method of claim 1, further comprising:

projecting an image on the fast vanishing light scattering surface/volume in synchronization with a density peak of the aggregated particles.

3. The method of claim 1, wherein the two portions of the atomized particles include liquid droplets formed from a liquid substance.

4. The method of claim 3, wherein the liquid droplets has a given surface tension for facilitating adhesion and aggregation upon collision/contact.

5. The method of claim 4, wherein a particle size of the liquid droplets is equal to or larger than 4 micron meters and smaller than or equal to 10 micron meters.

6. The method of claim 1, wherein the two portions of the atomized particles include solid particles formed from a solid substance.

7. The method of claim 6, wherein a particle size of the solid particles is equal to or larger than 4 micron meters and smaller than or equal to 10 micron meters.

8. The method of claim 1, wherein the two portions of the atomized particles include a mist or spray formed from a liquid substance.

9. The method of claim 1, wherein the two portions of the atomized particles include a fluorescent or phosphorescent substance which is substantially transparent and invisible to a human under the normal daylight condition.

10. The method of claim 1, wherein the two portions of the atomized particles include two different substances, which produce a fluorescent or phosphorescent substance upon collision/contact.

11. The method of claim 10, further comprising;

irradiating aggregated particles with a laser beam having a non-visible spectrum so as to activate the aggregated particles into the fluorescence or phosphorescence substance which is visible to a human.

12. The method of claim 1, further comprising:

charging the two portions of the atomized particles positively and negatively to thereby increase an aggregation efficiency.

13. The method of claim 1, further comprising:

allowing the aggregated particles to fall down with gravity, or applying an external force to the aggregated particles to speed up and dissipate them.

14. The method of claim 1, wherein the two portions of the atomized particles include a substance which emits an aromatic odor upon collision/contact.

15. The method of claim 1, wherein the two portions of the atomized particles include a substance which emits a light upon collision/contact.

16. The method of claim 1, wherein the two portions of the atomized particles include a substance which emits an aromatic odor upon irradiation by a laser beam.

17. The method of claim 1, wherein the two portions of the atomized particles include a substance which emits a light upon irradiation by a laser beam.

18. The method of claim 1, further comprising:

allowing the aggregated particles to fall down with gravity, or applying an external force via an accelerator to the aggregated particles to speed up and dissipate them.

19. The method of claim 1, further comprising:

adjusting an inclination of the two portions of the atomized particles to form a quasi-planar light scattering volume/surface and a relief/pattern of fog-tiles.

20. The method of claim 19, wherein:

selected ones of the fog-tiles are raised over other of the fog-tiles, inclined in opposite directions.

21. The method of claim 2, wherein:

the fast vanishing light scattering surface/volume disappears immediately after the collision/contact and aggregation of the atomized particles take place.

22. The method of claim 21, wherein:

the fast vanishing light scattering surface/volume has a quasi-planar shape which is synchronized with a momentary image projection.

23. The method of claim 1, wherein:

a time of existence of the fast vanishing light scattering surface/volume is predefined by a surface tension of the atomized particles.

24. The method of claim 1, wherein:

wherein a size of the atomized particles are ejected droplets about twice less than a size of the aggregated particles.

25. The method of claim 24, wherein:

wherein the aggregated particles scatter light by four times stronger than of the ejected droplets.

26. The method of claim 25, wherein:

the ejected droplets are substantially transparent and invisible.

* * * * *